Patented Feb. 14, 1939

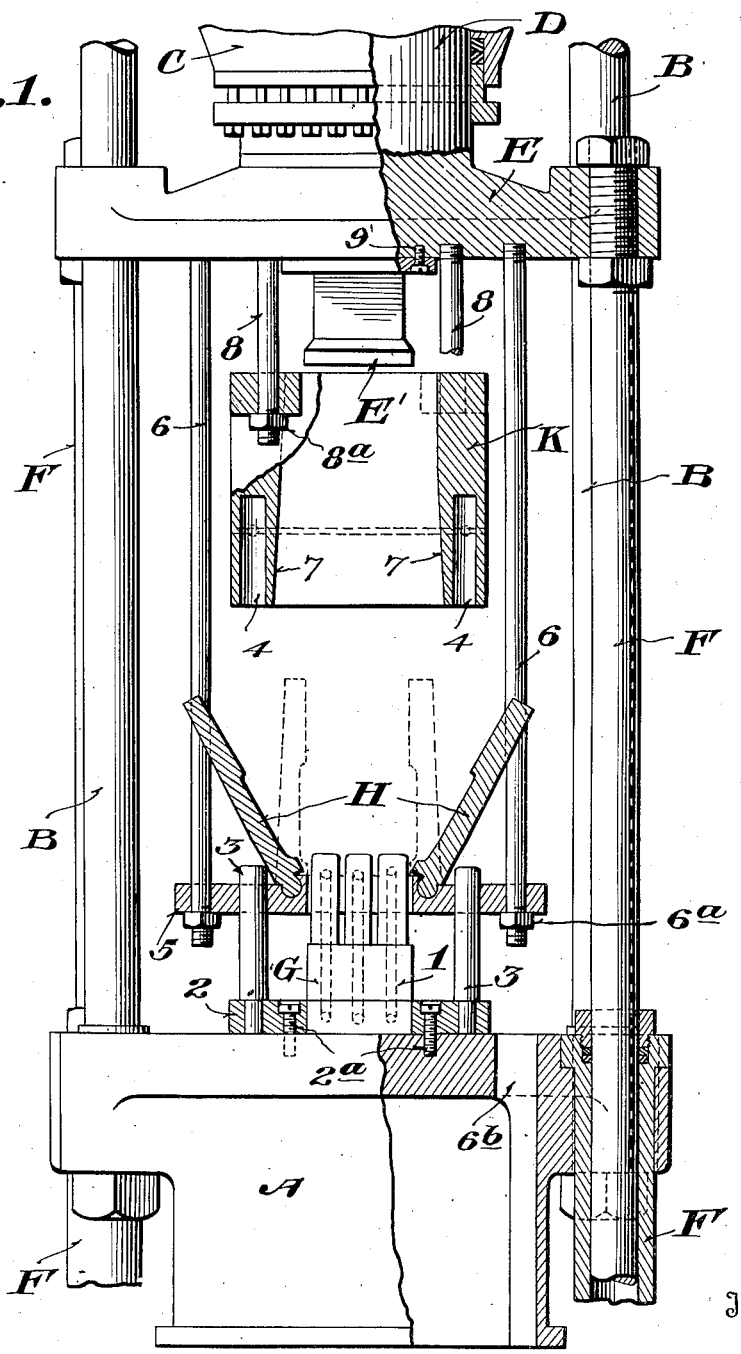

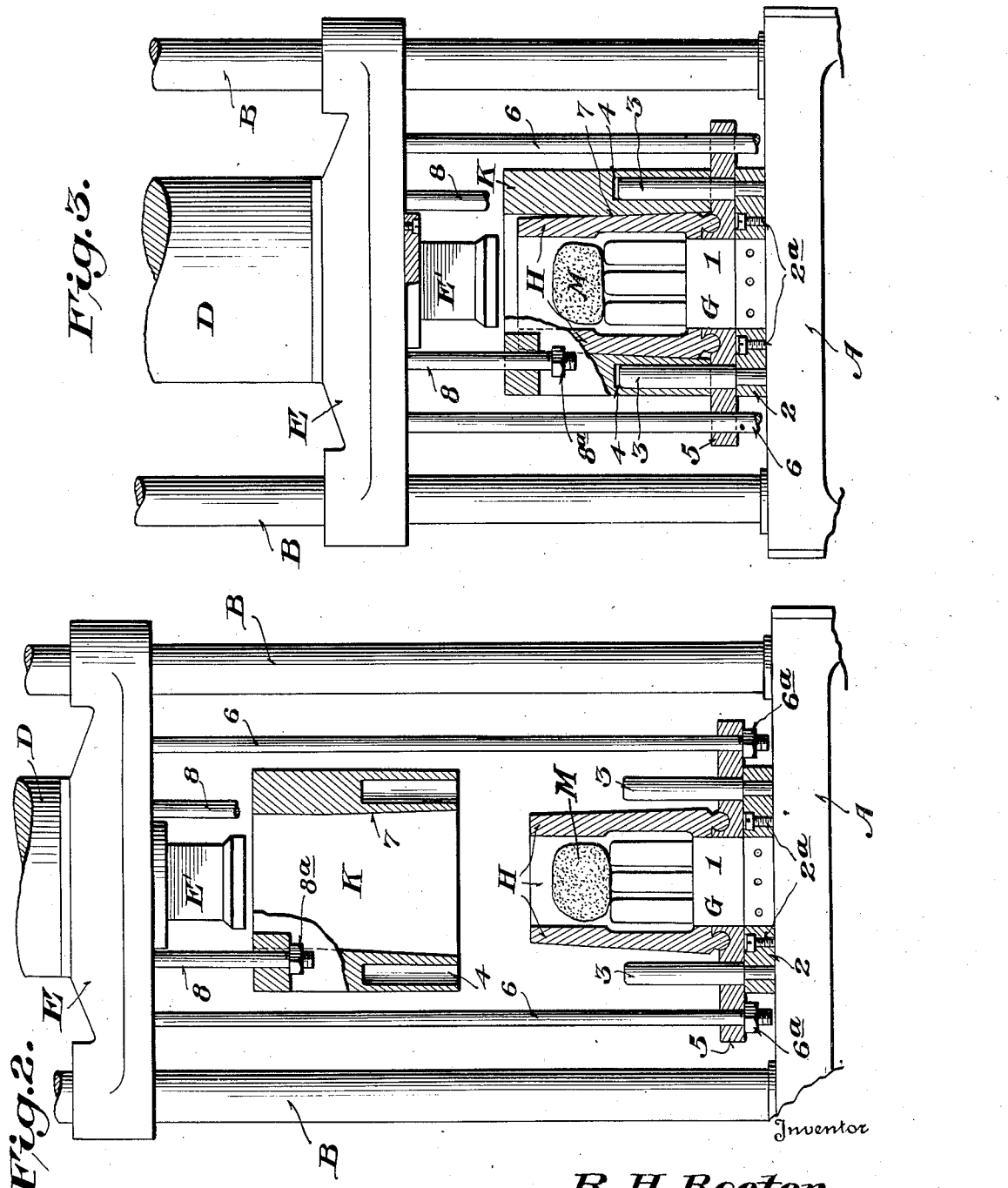

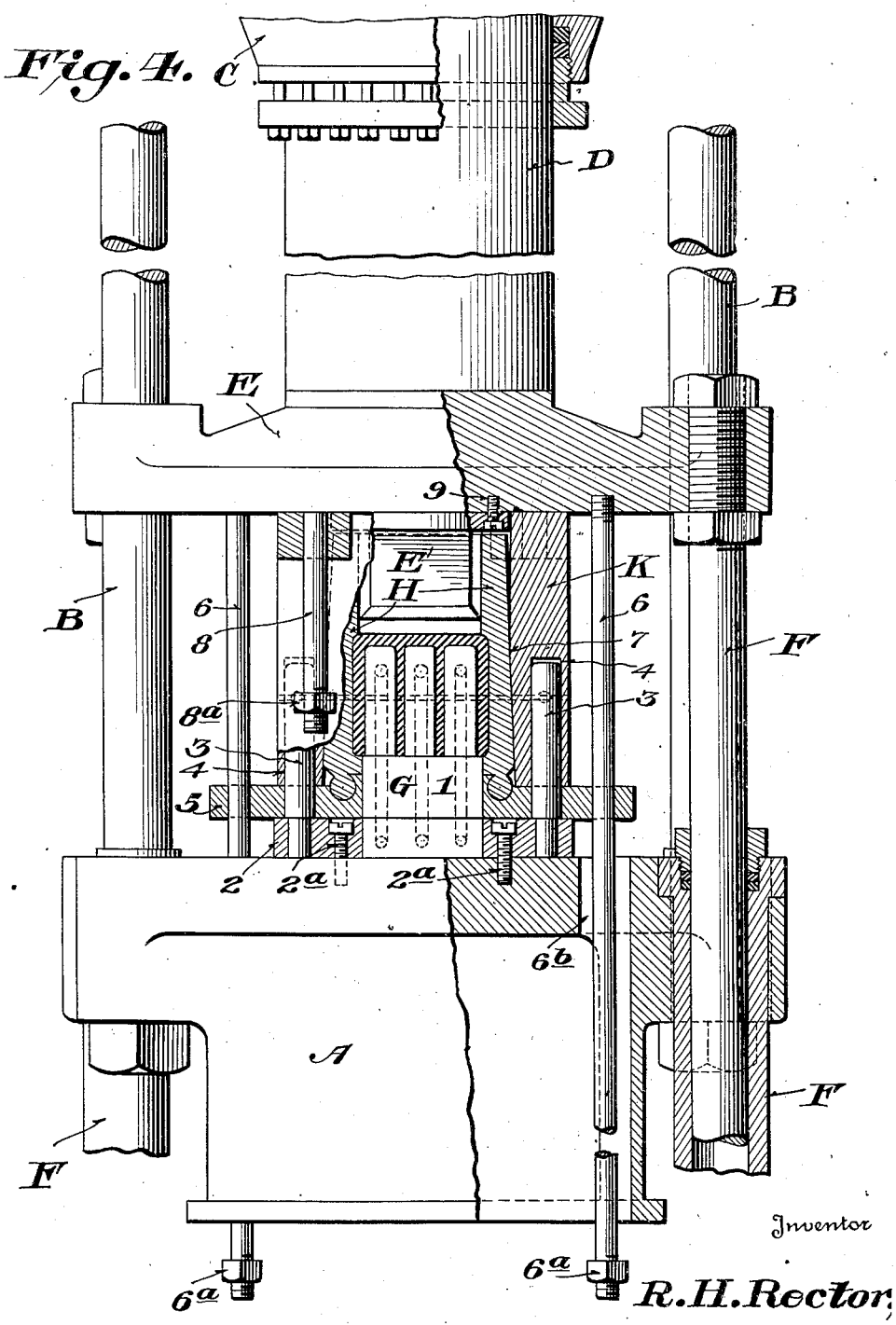

2,147,217

UNITED STATES PATENT OFFICE 2,147,217

MOLDING PRESS

Ralph H. Rector, Inglewood, Calif.

Application April 3, 1935, Serial No. 14,531

11 Claims. (Cl. 18—19)

This invention relates to molding presses for forming hollow plastic articles, such for example as battery boxes and the like.

In other types of presses, there is no definitely accurate or closely associated relation between the core and the plates which form the mold proper. Therefore, in the closing or pressing operation of presses of these other types there is the possibility of looseness or play, increased by wear, between the core and the plates of the mold proper due to either the relative movement of the parts or the distance that they must travel before the pressing operation begins. Consequently, it is impossible to form a box with definitely fixed dimensions because there is always likely to be some variation in this relationship under terrific pressure. Specifications may require that permissible variations of tolerance be held within one-thirty second of an inch ($\frac{1}{32}''$), and it is almost impossible to do so with the present type of mold and plate construction. Moreover, the variations due to the lack of proper relationship between the core and mold proper will be carried throughout all of the inside dimensions of the box, that is, from the top edge of the bridge-rests to the top of the box, etc. This is particularly true when so called "cover rests" are necessary in the boxes. Excessive variations in the distance between the top of the box and the cover rests will cause considerable difficulty in the assembly of the plate groups and covers in the box.

Accordingly, the present invention has primarily in view a construction which will avoid the difficulties above pointed out and which incorporates certain desirable improvements in both press construction and operation, consequently, providing a greatly improved product or article. As a part of this general object, it is proposed to provide a stationary core which is secured or fixed rigidly to a stationary bed plate and, therefore, remains immovable under all conditions of use and which cooperates with an articulated mold proper which is never disassociated from the core. This core and mold assembly receives an expressing member rigidly carried by a movable plunger head and whose operating stroke is independent of the core and mold parts, thereby to insure absolutely accuracy in the mold assembly prior to each operating stroke of the plunger toward the core and locked mold plates to produce an article or product with uniform accuracy.

Another object of the invention is to provide novel means for engaging and locking the mold plates prior to and during the pressing operation whereby they may be accurately and firmly held in place to effectively withstand the tremendous pressure incident to the article forming operation.

A further object is to provide a novel mold assembly wherein the articulated plates of the mold proper, although definitely associated with the stationary core may be moved slightly with reference thereto to effect the stripping of the finished article from the mold.

With the above and other objects in view which will more readily appear as the nature of the invention is better understood, the same consists in the novel features of construction, combination and arrangement of parts hereinafter more fully described, illustrated in the accompanying drawings and defined in the appended claims.

A preferred and practical embodiment of the invention is shown in the accompanying drawings, in which:—

Figure 1 is a front elevation, partly in section, of a molding press constructed in accordance with the present invention, with the various parts thereof in the position assumed at the beginning of the stroke.

Figure 2 is a more or less diagrammatic view illustrating the relative position of parts when the movable plunger head begins its downward stroke.

Figure 3 is a view similar to Figure 2 showing the relative position of parts when the plunger head has substantially completed its downward stroke, just prior to expressing the plastic material.

Figure 4 is a view similar to Figure 1 showing the plunger head at the bottom of its stroke with the mold proper completely closed and the formed article completed.

Similar reference characters designate corresponding parts throughout the several figures of the drawings.

Referring first to Figure 1, the general structural features and characteristics of the machine may be observed. In this figure, the stationary machine base and bed plate is designated generally as A, the same being provided at suitable points with the upwardly extending strain rods B which support a fluid cylinder C in a fixed location above the bed plate. The cylinder C is provided with a ram D which is intended to move the plunger head E downwardly on the strain rods B which serve as guides. For the purpose of lifting or elevating the plunger head E, push-back or elevating cylinders F also of the fluid type are used at each side of the apparatus, the same extending downwardly through the opposite sides of the bed plate A and having their upper ends operatively engaging the plunger head E. When fluid pressure is admitted to the cylinder C above the ram D, the plunger head E will be pushed downwardly and fluid will be consequently exhausted from the push-back or elevated cylinders F. On the other hand, after the plunger head E has completed its downward stroke, the push-back cylinders F are brought into play to restore the plunger head to its normal elevated position for the purpose of beginning a new press stroke.

The mold which works in conjunction with the press in forming the manufactured article consists essentially of several main elements, namely, a mold proper including a stationary core G and mold plates H articulated to a carrier surrounding the core; an extruding or expressing head E' carried by ram operated plunger E; and a mold lock casing K suspended from the power operated plunger head E.

Referring first to the core G, it will be observed that the same preferably includes a core body I having associated therewith a core holder 2 which is rigidly secured to the stationary bed plate by suitable fastenings 2ᵃ or their equivalent. The body of the core I may be formed in accordance with the shape of any article desired to be produced and may be provided with suitable passages for receiving a heating or cooling medium, as required, and as indicated by the dotted lines shown in the core. The core holder 2 is provided with a plurality of upstanding casing alining pins 3 which are suitably positioned on the holder and spaced with reference to the core to fit into the sockets 4 of the mold plate locking casing K when it descends toward the mold proper. The alining pins 3 also serve as a guide for a mold carrier and stripper member 5 which is provided with suitable openings for receiving the pins 3, and which is loosely carried by the lower ends of the stripper stems 6 whose upper ends are detachably but rigidly carried by the cross-head or plunger head E. For the purpose of adjusting the carrier 5 on the stems 6, the lower ends of the latter are threaded and provided with adjusting nuts 6ᵃ.

The mold carrier 5 has the mold plates H, previously referred to, articulated thereto in such a manner as to be balanced so that they may be swung to an outwardly inclined position, or to a vertical position as shown by dotted lines in Figure 1, thereby to retain either of these positions according to the desire of the operator and the condition of the apparatus.

The mold plate locking casing K is open at the center and the inner side walls 7 thereof are tapered to wedgingly engage with a corresponding taper on the outside of the four mold plates H to insure a tight and accurate fit between the casing and the mold plates when these two elements are brought into assembled relation. The casing K is suspended from the plunger head E by the rods 8 which are threaded at their lower ends and are provided with the nuts 8ᵃ for effecting relative adjustment of the casing with respect to the plunger head.

The plunger head E carries the plunger expressing member E', the same being rigidly secured to the plunger head by means of the fastenings 9 or their equivalent so that the expressing member will always operate with the plunger head and bears a definite fixed relation thereto. The plunger member E', of course, is intended to operate through the central opening of the casing K to express the plastic material around and about the stationary core I surrounded by the mold plates and lock casing as will presently appear.

In connection with the stripper stems 6 which slidably support the plate carrier or bolster 5, it may be observed that on the downward stroke of the plunger head E they are adapted to pass through openings 6ᵇ in the bed plate, which provide ample clearance for them on the downward stroke of the press.

Figures 1 to 4 inclusive of the drawings show the operation of the press in its several successive steps and reference will now be made to the operation as illustrated by these figures.

Referring first to Figure 1, the plunger head E is shown in its uppermost position with the mold plate locking casing K suspended from the rods 8 and the mold carrier 5 resting on the nuts 6ᵃ of the stems 6. In this position, the mold plates H may be open as shown by the full lines in Figure 1 which is the position they assume for permitting the finished article to be removed in the preceding article forming operation. The plates H may then be moved to the dotted line position in Figure 1 and the plastic material M, of which the article is to be formed, may be placed upon the top of the stationary core I. The plunger head E then begins its descent under the influence of the ram D. As the ram and plunger head descend downwardly the stems 6 are lowered and consequently the carrier 5 comes to rest on the core holder 2 as shown in Figure 2.

The continued descent of the ram and plunger head causes the stems 6 to overrun the carrier 5 and enter the openings 6ᵇ in the base and the casing K moves downwardly until the pins 3 on the core holder telescope within the sockets 4 of the casing. The tapered sides 7 of the mold embracing casing wedgingly engage the mold plates H and thus effectually hold all of the moving parts of the mold in rigid assembled relation as shown in Figure 3.

The final stage of downward movement of the plunger head E and the ram D causes the material M to be expressed into the final form of the desired article as shown in Figure 4. That is to say, the plunger head E, in its final movement, causes the extruding or expressing member E' to move through the opening of the mold locking casing and engage the material M forcing or extruding it through all parts of the mold cavities as shown in Figure 4. The member E' as previously pointed out is rigidly carried by the plunger head E and the relative movement between the plunger head and the core is limited by the vertical height of the casing K. Due to the fact that the plate 5 always seats uniformly on the flange or core holder 2, the mold plates also are definitely related to the core and the plastic material will always be distributed evenly throughout the mold cavity by the extruding head E' thereby providing a uniform top edge on the finished box so that a cover will evenly seat thereon and can be readily and effectively sealed against leakage.

When the article is completed as shown in Figure 4, the various parts are returned to their upward position as shown in Figure 1. The fluid pressure in the cylinder C is relieved so that the ram D may be pushed upwardly by the push-back cylinders F. That is to say, fluid pressure is admitted to the cylinders F to thereby lift or raise the plunger head E upwardly as shown by comparing Figures 4 and 1 with the result that the elevation of the plunger head first removes the plunger E', relieving all pressure on the mold assembly, and then the casing K from about the plates and subsequently, as the stroke continues, lifts the carrier 5 to strip the finished article from the core and render the mold plates H capable of being swung backwardly to remove the finished article. The initial upward movement of the plunger head E, after forming an article is idle with respect to the mold parts except that the pressure of the expressing member E' with respect to the article is relieved; but, as soon as the plunger head moves a sufficient distance to permit the nuts 8ᵃ on the rods to pick up the casing K, the latter also moves upwardly to clear the guide pins 3. When the locking casing K is clear of the mold proper, the stems 6 pick up the mold carrier 5 and strip the finished article from the mold, and, as previously described, the mold plates may then be opened to remove the article.

From the foregoing it will be apparent that the distinctive features of the invention reside in providing a mold proper including a core and articulated mold plates which are never separated and are relatively stationary or fixed with respect to an expressing plunger which is entirely free of the mold proper although it provides, in effect a bottom mold plate in the final forming operation. The articulated mold plates are fully locked together about the core in advance of the application of extruding pressure which makes it impossible for the plates to move during the actual forming of the article thereby insuring absolute accuracy in the finished product.

If there is any variation at all in the box it must be at the bottom and this will be very accurately controlled also. There will be no trimming on the box except on the bottom, which no other press heretofore has ever accomplished.

Moreover, the plunger head primarily performs all of the essential operations in the press, namely the locking together of the mold plates, the extrusion or expressing of the plastic material in the mold proper and the stripping of the finished article from the mold.

In this type of construction the operation is such that the core and the side plates are in a final fixed position during the application of pressure and until after the pressure is released.

Due to the article being formed in an inverted position and the core and plates being in final position before any pressure is applied to the material, it is possible to produce an article in which there is no variation of inside dimensions from one cycle to another due to fluctuations in pressure of weight of material used. In this molding press any such variations will be found in the bottom thickness of the formed article where it is relatively not nearly as important as on the inside, where accurate assembly of other articles may be placed to complete the finished product.

Due to the pressure being applied by the plunger, and the core and plates being in a fixed position, both during the application of pressure and until after the pressure is released, there is no tendency to set up internal strains or cracks in the formed article as occurs when there is relative motion between core and plates under pressure.

It is possible to form the side walls and partitions, if desired, of a formed article of a more dense and uniform nature as due to the action of the plunger in forcing the material down and around a stationary core the final pressure developed in the mold builds up from the top of the inverted formed article toward its bottom and the final movement of material is in the bottom of the formed article. This is the reverse of other forming operations where the final movement of material occurs at the top of the formed article.

As the plunger is the only mold part which moves under pressure, all other mold parts being in fixed positions during such movements, there is considerably less wear on the mold parts than there is in other types of molding presses. Excess wear results in considerable maintenance and replacement expense and also in poorly fitting mold assembles which produce inferior articles.

Formed articles produced in this press will require very little finishing or removal of overflow, particularly at the top of the article where such finishing marks are unsightly and detract from the appearance and value of the finished article, due to the plates and core being in their final positions before any pressure is put upon the material causing it to flow.

Due to the plates being pivoted near where the top of the molded article is formed, and in close contact to the core, which may be heated, there is less loss of heat from the plates at that point, as compared to their opposite ends, when the mold is open. This results in a better flow of material near the top of the formed article where such action is most desirable to produce a superior product.

Without further description it is thought that the features and advantages of the invention will be readily apparent to those skilled in the art, and it will of course be understood, that changes in the form, proportion and minor details of construction may be resorted to, without departing from the spirit of the invention and scope of the appended claims.

I claim:—

1. A molding press including a stationary core and articulated mold plates assembled about the core, a power operated head mounted for movement toward and from the core, an expressing plunger on the plunger head cooperating with the mold plate assembly to express plastic material about the core, and a mold plate locking casing carried by the plunger head and operable by movement of the plunger head toward the core to engage and hold the mold plates in fixed position relative to the core prior to initiation of the expressing operation and during said operation.

2. In a molding press, a stationary core, articulated mold plates assembled about the core, a plunger including an expressing member movable toward and from the core and the mold plate assembly, and means carried by said plunger operable to lock the mold plates in closed assembled relation about the core prior to expressing operation of the expressing member.

3. A molding press including a stationary base having stripper stem clearances, strain rods extending upwardly from the base, a power actuated plunger head slidable on the strain rods and including an extruding head, a core fixed on the stationary base, a carrier surrounding the core and capable of limited movement relative thereto, stripper stems carried by the plunger head and operating in said stripper clearances of the base on the downward stroke of the plunger head, carrier pick-up means carried by the stripper stems for engaging the carrier for a portion of the movement of the plunger head, a plurality of mold plates articulated to the carrier and assembled about the core, and a mold locking casing loosely suspended from the plunger head and adapted to rigidly embrace said mold plates on the downward stroke of the plunger head prior to the extruding head of the plunger making its extruding stroke with reference to the core.

4. A molding press including a stationary base having stripper stem clearances, strain rods extending upwardly from the base, a power actuated plunger head slidable on the strain rods, an extruding head on the plunger head, a core on the stationary base, a holder for the core, guide pins carried by the said holder, a mold carrier having openings and surrounding the core and capable of limited movement relative thereto, stripper stems carried by the plunger head and operating through said openings in the mold carrier and also through said stripper clearances of the base on the downward stroke of the plunger head, carrier pick-up means carried by the stripper stems for engaging the carrier for a portion of the movement of the plunger head, a plurality of mold plates articulated to the carrier and assembled about the core, and a mold locking casing having sockets for receiving said guide pins on the core holder, said locking casing loosely suspended from the plunger head and adapted to rigidly embrace said mold plates on the downward stroke of the plunger head prior to the extruding head of the plunger making its extruding stroke with reference to the core.

5. In a molding press, a core, an articulated mold assembly around said core, a plunger head above and downwardly and upwardly movable relative to said core and mold assembly, an expressing member carried by said plunger head, a mold assembly locking casing suspended from said plunger head for upward movement relative to said head, said locking casing being operable by downward movement of the plunger head to engage and lock the mold assembly prior to initiation of the expressing operation of the expressing member, and means operable by upward movement of the plunger head relative to the core and mold assembly to elevate the mold assembly relative to the core, thus to strip a formed article from the core.

6. In a molding press, a fixed mold core, a stripper plate engaged over and movable outwardly along said core to strip a formed article therefrom, mold plates articulated to said stripper plate, a plunger head movable toward and from said core, an expressing member carried by said plunger head, mold plate locking means, and means operable by outward movement of the plunger head relative to the core following inward expressing movement of the plunger head and the expressing member to move said stripper plate outwardly relative to the core to strip a formed article therefrom.

7. In a molding press, a fixed mold core, a stripper plate engaged over and movable outwardly along said core to strip a formed article therefrom, mold plates articulated to said stripper plate, a plunger head movable toward and from said core, an expressing member carried by said plunger head, a mold plate locking casing carried by said plunger head for movement towards said head when the latter is moved toward the core so that said casing is engageable with the mold plates to lock the same prior to initiation of the expressing operation and to maintain them locked during the expressing operation, and a connection between the plunger head and the stripper plate operable by outward movement of the plunger head relative to the core following the expressing operation to move the stripper plate outwardly relative to the core to strip a formed article therefrom.

8. In a molding press, a fixed mold core, a stripper plate engaged over and movable outwardly along said core to strip a formed article therefrom, mold plates articulated to said stripper plate, a plunger head movable toward and from said core, an expressing member carried by said plunger head, a mold plate locking casing having a lost motion connection with said plunger head and normally spaced from said head so that when the head is moved toward the core said casing engages and locks the mold plates prior to initiation of the expressing operation and upon subsequent outward movement of the plunger head the casing is moved outwardly therewith to release the mold plates, and a lost motion connection between the plunger head and the stripper plate operable by outward movement of the plunger head relative to the core following the expressing operation and following outward movement of the locking casing to release the mold plates to move the stripper plate outwardly relative to the core to strip a formed article therefrom.

9. In a molding press, a fixed mold core, a stripper plate engaged over and movable outwardly along said core to strip a formed article therefrom, mold plates articulated to said stripper plate, a plunger head movable toward and from said core, an expressing member carried by said plunger head, mold plate locking means operable by movement of the plunger head toward the core to lock the mold plates prior to the expressing operation and operable by outward movement of the plunger head relative to the core following the expressing operation to release the mold plates, and means also operable by outward movement of the plunger head relative to the core following the expressing operation and release of the mold plate locking means to move said stripper plate outwardly relative to the core to strip a formed article therefrom.

10. In a molding press, a mold core, a stripper plate engaged over and movable outwardly along said core to strip a formed article therefrom, mold plates articulated to said stripper plate, a plunger head movable relative to said core toward and from the same, an expressing member carried by said plunger head, mold plate locking means, and means operable by outward movement of the plunger head relative to the core following inward expressing movement of the plunger head and the expressing member relative to the core to move said stripper plate outwardly relative to the core to strip a formed article therefrom.

11. A molding press including a mold comprising a stationary core and articulated mold plates assembled about said core, a plunger head movable toward and away from said core, an expressing plunger carried by said plunger head, and means operated by said plunger head in advance of expressing operation of said expressing plunger and during the complete expressing cycle of the latter to hold the mold plates in fixed position relative to said core.

RALPH H. RECTOR.